US008100796B2

(12) United States Patent
O'Donnell

(10) Patent No.: US 8,100,796 B2
(45) Date of Patent: Jan. 24, 2012

(54) ELEVATOR BELT ASSEMBLY WITH PRESTRETCHED CORDS

(75) Inventor: Hugh James O'Donnell, Longmeadow, MA (US)

(73) Assignee: Otis Elevator Company, Farmington, CT (US)

( * ) Notice: Subject to any disclaimer, the term of this patent is extended or adjusted under 35 U.S.C. 154(b) by 1614 days.

(21) Appl. No.: 10/522,191

(22) PCT Filed: Sep. 25, 2002

(86) PCT No.: PCT/US02/30394

§ 371 (c)(1),
(2), (4) Date: Jan. 25, 2005

(87) PCT Pub. No.: WO2004/029343

PCT Pub. Date: Apr. 8, 2004

(65) Prior Publication Data

US 2006/0137896 A1 Jun. 29, 2006

(51) Int. Cl.
*F16G 5/00* (2006.01)
*B05D 3/12* (2006.01)

(52) U.S. Cl. ..... 474/238; 474/237; 428/375; 428/298.1; 428/299.7; 428/295.4; 427/175; 187/251

(58) Field of Classification Search ..................... None
See application file for complete search history.

(56) References Cited

U.S. PATENT DOCUMENTS

| | | | | |
|---|---|---|---|---|
| 1,412,310 | A * | 4/1922 | Lambert | 156/137 |
| 2,740,459 | A * | 4/1956 | Suloff et al. | 156/178 |
| 3,441,641 | A * | 4/1969 | Roberts | 264/229 |
| 4,227,041 | A | 10/1980 | Den et al. | |
| 4,445,593 | A | 5/1984 | Coleman et al. | |
| 6,672,046 | B1 * | 1/2004 | Prewo et al. | 57/232 |
| 6,739,433 | B1 * | 5/2004 | Baranda et al. | 187/411 |
| 2003/0092524 | A1 * | 5/2003 | Baranda et al. | 474/266 |

FOREIGN PATENT DOCUMENTS

| | | | |
|---|---|---|---|
| EP | 0257459 | A2 | 3/1988 |
| WO | WO 01/14630 | A1 * | 3/2001 |

OTHER PUBLICATIONS

Merriam-Webster Online Dictionary.*

* cited by examiner

*Primary Examiner* — Jill Gray
(74) *Attorney, Agent, or Firm* — Carlson, Gaskey & Olds PC

(57) ABSTRACT

An elevator load bearing assembly (40) includes a plurality of synthetic or polymer cords (42) within a urethane jacket (44). The cords are prestretched and the jacket prevents the stretched cords from relaxing. The inventive arrangement provides a load bearing assembly (40) that has little or no elastic or construction stretch.

12 Claims, 1 Drawing Sheet

ELEVATOR BELT ASSEMBLY WITH PRESTRETCHED CORDS

BACKGROUND OF THE INVENTION

This invention generally relates to load bearing members for use in elevator systems. More particularly, this invention relates to an elevator belt assembly having a prestretched polymer cords encased in a polyurethane material.

Elevator systems typically include a cab and counterweight that move within a hoistway to transport passengers or cargo to different landings within a building, for example. A load bearing member, such as roping or a belt typically moves over a set of sheaves and supports the load of the cab and counterweight. There are a variety of types of load bearing members used in elevator systems.

The traditional load bearing member has been a steel rope. While this arrangement has proven useful, those skilled in the art are always striving to make improvements. Lighter weight and greater strength are two example load bearing assembly characteristics that are highly desirable. Larger buildings, for example require elevators that travel greater distances, which increases the required length of the load bearing assembly. Lighter weight alternatives would improve the economies associated with elevator systems in such buildings.

While some alternative belt arrangements using lighter weight materials have been proposed, there is a need to satisfy typical safety codes and passenger ride quality standards. Typical codes require belts to meet selected strength criteria, and ride quality requires a minimum amount of stretch. If alternative materials were used, the design issues associated with meeting strength and stretch requirements potentially becomes more complex. Lighter weight materials may be more susceptible to stretch and have different breaking strengths depending on the material composition.

This invention provides a solution to making a load bearing assembly, which has polymer material cords instead of steel, that is able to satisfy strength and stretch requirements.

SUMMARY OF THE INVENTION

In general terms, this invention is an elevator belt assembly that has prestretched synthetic material cords encased in a jacket that keeps the cords in a stretched condition. The inventive arrangement provides a belt assembly that has minimal elastic or construction stretch.

In one example, the cords are pre-stretched using tension that is approximately 10% of the cord breaking strength.

A method according to this invention for making an elevator belt assembly includes aligning a plurality of synthetic material cords in a selected arrangement. Each of the cords are tensioned to pre-stretch the cords. The stretched cords are coated with a jacket so that the resulting belt assembly has cords already stretched a selected amount.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
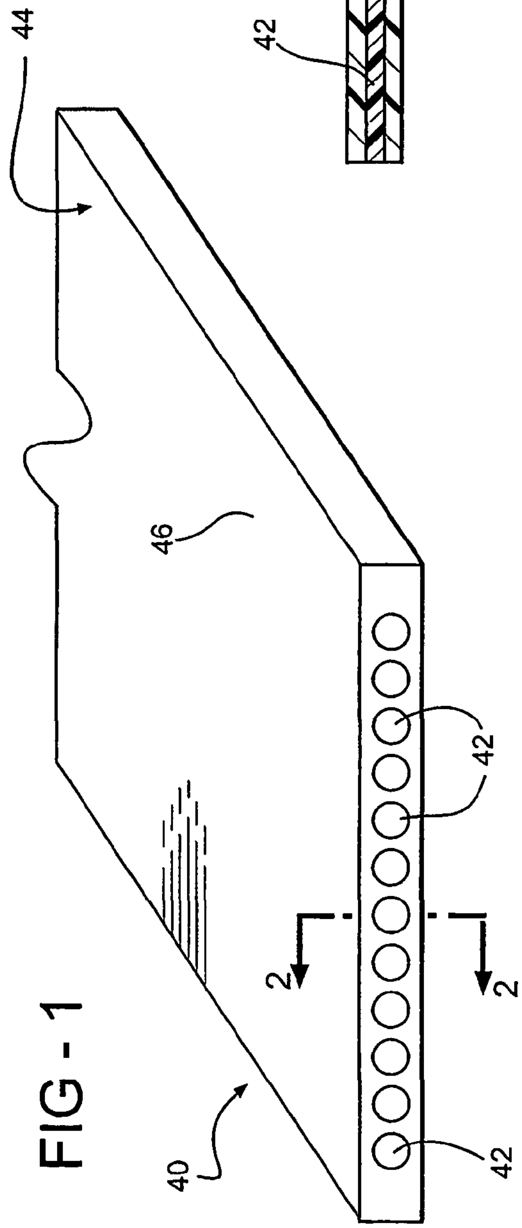
FIG. 1 schematically illustrates a portion of an example belt assembly designed according to this invention.
Figure 2:
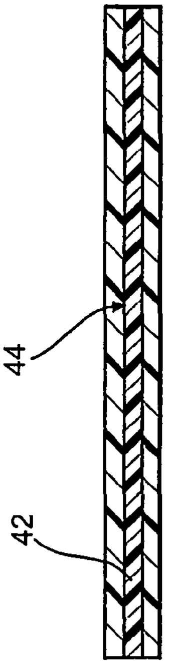
FIG. 2 is a cross-sectional illustration taken along the lines 2-2 in FIG. 1.

FIGS. 1 and 2 schematically illustrate a portion of a belt assembly 40 that is designed for use in an elevator system. A plurality of cords 42 are aligned generally parallel to a longitudinal axis of the belt assembly 40. The cords 42 are prestretched a desired amount during the belt assembly process so that the inventive arrangement provides a belt assembly that has little or no elastic stretch or construction stretch when the belt is subjected to operating loads once installed in an elevator system.

A flat belt assembly having rounded cords is illustrated as an example in FIGS. 1 and 2 but this invention is not necessarily so limited. Other load bearing assembly configurations fit within the scope of this invention such as roping that is not flat or an assembly that includes flat cords. The term “belt” as used in this description should not be construed in its strictest sense but must be understood to refer to a variety of load bearing member assembly designs.

The cords 42 preferably comprise a synthetic (most preferably a polymer) material. Example materials include PBO, which is sold under the trade name Zylon; liquid crystal polymers such as a polyester-polyarylate, which is sold under the trade name Vectran; p-type aramids such as those sold under the trade names Kevlar, Technora and Twaron; or an ultra-high molecular weight polyethylene, an example of which is sold under the trade name Spectra; and nylon. Given this description, those skilled in the art will be able to select appropriate material or combination of materials to meet the needs of their particular situation.

Using a synthetic or polymer material allows for a belt having a higher strength-to-weight ratio compared to steel coated belts, for example.

A jacket 44 covers over the cords 42. The jacket 44 preferably comprises a polyurethane-based material that is not compressible when cured. A variety of such materials are commercially available and known in the art to be useful for elevator belt assemblies. In one example, the preferred urethane material is an ether based polyurethane. In a particular example, an MDI ether based material is preferred for one particular embodiment of this invention.

The jacket material preferably is substantially not compressible when cured and has characteristics that render the belt assembly useful over long periods of time within an elevator system. The friction characteristics of the jacket material preferably are controlled precisely. In one example, a friction co-efficient value of 0.2 relative to the material of the traction sheave is the minimum preferred co-efficient. Having sufficient jacket friction characteristics ensures proper traction during operation of the elevator system.

The jacket material preferably has a high wear resistance and is resistant to cuts or tears so that abrasion of the belt assembly does not readily occur over the lifetime of the assembly. It is recognized that abrasion to the jacket contributes to induced vibrations and premature belt replacement and, therefore, a sufficient cut resistance or tear resistance is desired.

An additional desired characteristic of the jacket material is to have an adequate tensile strength to carry the load between the cords 42 and the sheaves within the elevator system. Because the jacket material contacts the sheaves, the load upon the cords must be accommodated between the cords and the sheaves by the jacket material.

The compression set characteristic of the jacket material impacts ride quality. In one example, the compression set preferably is about 40%.

Another characteristic of the jacket material that is preferred is a high hydrolysis resistance to avoid degradation of the jacket, which may otherwise occur because of the relatively high temperatures and relatively high humidity levels commonly experienced within an elevator hoistway. The material also preferably will not be adversely affected by other contaminants, such as lubricants, that may be encountered in some hoistways. It is also desirable to select a material so that ultraviolet radiation resistance is maximized.

The following chart summarizes desired characteristics of the jacket material in one example assembly designed according to this invention.

| Property | Desired/Preferred | Test Methodology |
|---|---|---|
| Cut tear resistance | ≧50 N/mm$^2$<br>≧70 N/mm$^2$ | ASTM D 624, ISO 34 |
| Tensile strength | ≧45 N/mm$^2$<br>50-60 N/mm$^2$ | ASTM D 1456, ISO 37 |
| Hydrolysis resistance (evaluation per abrasion loss) | ≦55 mm$^3$<br>~40 mm$^3$ | ASTM D 5963, ISO 4649 (84 days @ 80° C. 95% Rel. Hum.) |
| Compression set | ≦50%<br>~40% | ASTM D 395, ISO 815 (24 hrs @ 70° C.) |

Given this description, those skilled in the art will be able to select a proper jacket material to suit the needs of their particular situation.

Figure 3:
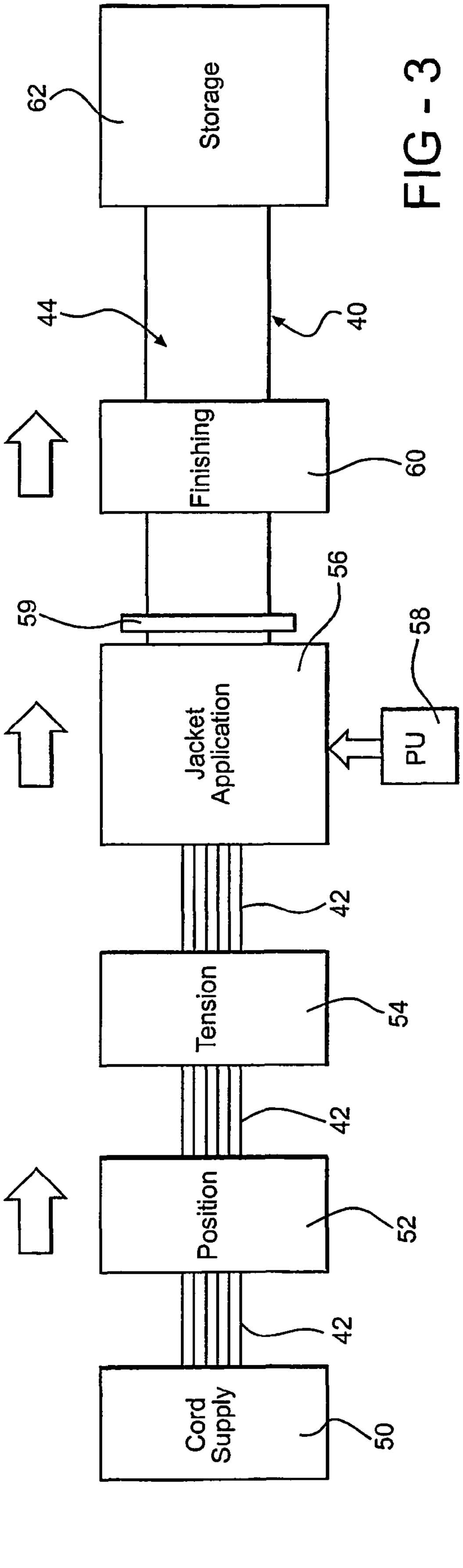
FIG. 3 is a schematic illustration of method of making a belt assembly designed according to an embodiment of this invention.

FIG. 3 schematically illustrates a method of making a belt assembly 40 designed according to this invention. A cord supply 50 provides the cords 42.

In one example, each cord is pre-made and wound upon an individual spool. An example belt assembly includes twelve individual polymer cords.

A positioning device 52 aligns the cords 42 in a desired alignment so that the cords will extend parallel to a longitudinal axis of the belt assembly 40. The cords are stretched using a load that is selected to correspond to a desired percentage of the breaking strength of the cords. The inventive approach includes applying a load that exceeds the anticipated loads when the belt assembly is placed in service in an elevator system. In one example, the cords are prestretched using a load that is at least approximately 10% of the breaking strength of the cords. The tension pre-stretching the cords at the 10% of the breaking strength level is selected in this example because elevator safety codes require safety factors typically in the range from 10:1 up to 12:1. Pre-stretching the cords at the 10% level results in belts with little or no elastic stretch and no construction stretch. In other words, the belt design typically allows for up to a 10% stretch so that the belt design meets safety codes. By pre-stretching at the 10% level, when the belt is placed in service after being installed in an elevator system, there is essentially no stretch during system operation.

A tensioning device 54 applies the stretching load and controls an amount of tension on the cords 42 during the manufacturing process. Although a single tension station 54 is schematically illustrated, multiple tension devices may be used along the assembly line of the belt assembly 40. For example, the same tension preferably is applied to the cords on both sides of a jacket application station 56. The tension station 54 preferably includes a suitably programmed controller that monitors and controls the tension within a desired range to pre-stretch the cord.

Although not specifically illustrated, tension feedback devices (as known in the art) preferably are incorporated into the manufacturing equipment so that the tension on each individual cord can be monitored and adjusted as needed throughout the entire assembly process.

The jacket application station 56 preferably includes a suitable mold or other device for applying the jacket material onto the cords 42. A supply 58 provides the chosen material to the jacket application station 56 in a conventional manner. The jacket material may be pressure molded, extruded or otherwise applied to the cords 42. The preloaded cords 42 are bonded to the jacket and covered in the urethane material in a manner that prevents any relaxation or unloading of the cords from the prestretched condition.

In one example, rollers 59 are included as part of or immediately after the jacket application station 56. The rollers 59 preferably are TEFLON™ (polytetrafluoroethylene) coated. The rollers 59 provide a surface treatment to the belt assembly immediately after the application of the jacket material. The rollers 59 may provide an embossed pattern on the jacket surfaces, for example. The rollers 59 facilitate dimensional control of the jacket exterior.

The formed belt assembly 40 preferably is then processed at a finishing station 60. In one example, the finishing station 60 includes a forming device, a dimensional inspection device and a curing cold water bath where the jacket material and the cords within the material are cooled to a suitable temperature.

Once cured, the jacket 44 maintains the cords 42 in the prestretched condition. Accordingly, the inventive belt assembly has cords that are already stretched before the belt assembly is installed in an elevator system. The inventive belt assembly experiences little if any elastic or construction stretch. The tolerances for how much stretch, if any, is desired for a given situation can be controlled by controlling the load applied to stretch the cords during assembly, for example. Given the selected materials and the particular requirements of a situation, those skilled in the art who have the benefit of this description will be able to control the manufacturing parameters necessary to achieve a desired level of stretch resistance in a finished belt assembly designed according to this invention.

The resulting belt assembly 40 preferably is then stored at 62, for example on spools for shipment to various locations for installation in elevator systems. The belt assembly 40 may be precut to specific lengths or may be provided in larger quantities where a technician at the installation selects the appropriate amount of belt material for a particular application.

The preceding description is exemplary rather than limiting in nature. Variations and modifications to the disclosed examples may become apparent to those skilled in the art that do not necessarily depart from the scope of this invention. The scope of legal protection given to this invention can only be determined by studying the following claims.

I claim:

1. An elevator belt assembly, comprising:

a plurality of cords that are stretched to an increased length; and a jacket comprising a substantially noncompressible urethane over the stretched cords that keeps the cords stretched a desired amount without any external load applied to the belt assembly.

2. The assembly of claim 1, wherein the belt assembly has limited elastic stretch.

3. The assembly of claim 1, wherein the cords comprise a synthetic material.

4. The assembly of claim 1, wherein the jacket comprises an ether based polyurethane.

5. The assembly of claim 1, wherein the cords are stretched an amount corresponding to a load that exceeds an anticipated greatest load that the assembly will experience once installed in an elevator system.

6. The assembly of claim 1, wherein the cords are stretched an amount corresponding to a load that is at least approximately 10% of the cord breaking strength.

7. An elevator belt assembly made by the process, comprising the steps of:

(a) aligning a plurality of cords in a selected arrangement;

(b) stretching the cords by applying a selected amount of tension to increase a length of the cords; and (c) applying a selected jacket material comprising a substantially noncompressible urethane to the stretched cords to encase the cords in the jacket;

wherein the cords remain stretched within the jacket without any external load applied to the belt assembly.

8. The assembly of claim 7, wherein the cords comprise a synthetic material.

9. The assembly of claim 7, wherein the jacket material comprises an ether based polyurethane.

10. A method of making an elevator belt assembly having a plurality of cords within a jacket, comprising the steps of:

(a) aligning the plurality of cords in a selected arrangement;

(b) tensioning the cords a selected amount to stretch and increase a length of the cords; and (c) applying a selected jacket material comprising a substantially noncompressible urethane to the cords to encase the cords in the jacket so that the cords remain stretched within the jacket wherein the cords are tensioned using a load that exceeds an anticipated greatest load that the belt assembly will experience once installed in an elevator system.

11. A method of making an elevator belt assembly having a plurality of cords within a jacket, cormrising the steps of:

(a) aligning the plurality of cords in a selected arrangement;

(b) tensioning the cords a selected amount to stretch and increase a length of the cords; and (c) applying a selected jacket material comprising a substantially noncompressible urethane to the cords to encase the cords in the jacket so that the cords remain stretched within the jacket, wherein the cords are tensioned using a load corresponding to a desired percentage of a breaking strength of the cords, wherein the load corresponds to at least approximately 10% of the cord breaking strength.

12. The method of claim 10, wherein the jacket material comprises an ether based polyurethane.

* * * * *